United States Patent
Geisler

(10) Patent No.: US 11,556,727 B1
(45) Date of Patent: Jan. 17, 2023

(54) PERSONAL USER QR CODE-HOLOGRAPHIC SYSTEM

(71) Applicant: QR-me, LLC, Dumfries, VA (US)

(72) Inventor: James Geisler, Dumfries, VA (US)

(73) Assignee: QR-ME, LLC, Dumfries, VA (US)

( * ) Notice: Subject to any disclaimer, the term of this patent is extended or adjusted under 35 U.S.C. 154(b) by 0 days.

(21) Appl. No.: 17/409,385

(22) Filed: Aug. 23, 2021

(51) Int. Cl.
*G06K 7/14* (2006.01)
*G06K 19/06* (2006.01)

(52) U.S. Cl.
CPC ..... *G06K 7/1417* (2013.01); *G06K 19/06037* (2013.01)

(58) Field of Classification Search
CPC .................. G06K 7/1417; G06K 19/06037
See application file for complete search history.

(56) References Cited

U.S. PATENT DOCUMENTS

| | | | |
|---|---|---|---|
| 10,762,812 B1* | 9/2020 | Thornton | G02B 30/40 |
| 2012/0204307 A1* | 8/2012 | De Mattei | H04N 21/431 |
| | | | 2/69 |
| 2013/0126596 A1* | 5/2013 | Fletcher | G06Q 10/103 |
| | | | 235/375 |
| 2015/0254902 A1* | 9/2015 | Macia | H04L 67/36 |
| | | | 345/633 |
| 2019/0377330 A1* | 12/2019 | Shors | G06V 30/224 |
| 2020/0090224 A1* | 3/2020 | Falconer | G02B 27/01 |

* cited by examiner

*Primary Examiner* — Sonji N Johnson
(74) *Attorney, Agent, or Firm* — William Gray Mitchell

(57) ABSTRACT

The invention is a system allowing an individual user to display a readable unique QR code, which code can be read by the mobile devices of customers, whose devices will thereby be connected to an online user profile.

13 Claims, 3 Drawing Sheets

Fig. 4

1. Download mobile application onto user's mobile device

2. obtaining a unique QR Code for the user

3. creating a user profile on the mobile application

4. associating the unique QR Code with the user profile

5. projecting the unique QR Code as a visible image in proximity to the user

6. reading the unique QR Code with the camera of the customer mobile device

7. linking the customer to the user profile on the customer mobile device

PERSONAL USER QR CODE-HOLOGRAPHIC SYSTEM

CROSS REFERENCE TO RELATED APPLICATIONS

Not applicable.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a system allowing an individual user to display a readable holographically displayed, projection displayed, or physically displayed QR code within proximity to the user, which code can be read visually, or by the mobile devices of potential customers or interested individuals, whose devices will then be connected to the user's online profile.

Background of the Invention

The use of QR codes directing users in public settings to information available on websites is well known. Such codes are increasingly used in retail and hospitality settings, where patrons are presented with the codes on signage, handout materials or otherwise and directed to scan the code with their mobile devices to access and/or download items such as product specifications, menus, pricing, etc.

In its standard usage, the term QR code is abbreviated from Quick Response code, and is a type of matrix, two-dimensional barcode. A barcode is a machine-readable optical label that contains information about the item to which it is attached. In practice, QR codes often contain data for a locator, identifier, or tracker that points to a website or application. A QR code uses four standardized encoding modes (numeric, alphanumeric, byte/binary, and kanji) to store data efficiently. A QR code consists of black squares arranged in a square grid on a white background, which can be read by an imaging device, such as a camera, and processed using Reed-Solomon error correction until the image can be appropriately interpreted. The required data is then extracted from patterns that are present in both horizontal and vertical components of the image.

The Quick Response system has become popular due to its fast readability and greater storage capacity compared to standard UPC barcodes. Applications include product tracking, item identification, time tracking, document management, and general marketing. In this particular application, a tattoo, or branding on an item of clothing can be utilized to communicate the individual's unique QR Code, which can and will be read by interested individuals with a simple QR reader application that is readily available as a Smart Phone app.

Holography is a technique that enables a wavefront to be recorded and later re-constructed. Holography is best known as a method of generating three-dimensional images, but it also has a wide range of other applications. In principle, it is possible to make a hologram for any type of wave.

A hologram, also known as a holograph, is made by superimposing a second wavefront (normally called the reference beam) on the wavefront of interest, thereby generating an interference pattern which is visable and recorded as a physical medium. When only the second wavefront illuminates the interference pattern, it is diffracted to recreate an original wavefront. Holograms can also be computer-generated by modelling the two wavefronts and adding them together digitally. Until recently, the resulting digital image has then been printed or projected onto a suitable screen, mask or film and illuminated by a suitable source to reconstruct the wavefront of interest.

The creation of three-dimensional projection now opens new possibilities for the use of QR codes. In general, a 3D projection (or graphical projection) is a design technique used to display a three-dimensional (3D) object on a two-dimensional (2D) surface. These projections rely on visual perspective and aspect analysis to project a complex object for viewing capability on a simpler plane.

3D projections use the primary qualities of an object's basic shape to create a map of points, that are then connected to one another to create a visual element. The result is a graphic that contains conceptual properties to interpret that the figure or image as not actually flat (2D), but rather, as a solid object (3D) being viewed on a 2D display.

3D objects are largely displayed on two-dimensional mediums (i.e. screens). As such, graphical projections are a commonly used design element; notably, in engineering drawing, drafting, and computer graphics. Projections can be calculated through employment of mathematical analysis and formulae, or by using various geometric and optical techniques.

While holographic projections have typically required the use of some type of screen-type feature, technology now exists to create holographic displays utilizing light diffraction to create virtual three-dimensional images that require neither screens nor special glasses for viewers to see the image. New holographic display technologies include:

Laser plasma. Laser plasma displays utilize a series of lasers that focus light in desired positions in order to create plasma excitations with the oxygen and nitrogen molecules in the air. This type of holographic display is capable of producing images in thin air, without the need for any sort of screen or external refraction media. The laser plasma display is able to depict very bright and visible objects, but it lacks in terms of resolution and picture quality.

Micromagnetic piston display. The piston display, invented by Belgian company IMEC in 2011, utilizes a MEMS (micro-electro-mechanical system) based structure. In this type of display, thousands of microscopic pistons are able to be manipulated up and down to act as pixels, which in turn reflect light with a desired wavelength to represent an image. This developing technology is currently in the prototype phase, as IMEC is still developing the mechanism that will mobilize their "pixels" more effectively. Some of the limitations of this type of this display include the high cost, difficulty of creating large screens, and its susceptibility to mechanical failures due to the relatively large amount of moving parts (microscopic pistons).

Holographic television display. The holographic television display uses a three-dimensional camera (originally, a Microsoft Kinect® camera) as a relatively effective way to capture subjects in a three-dimensional space. The image is then processed by a PC graphics card and replicated with a series of laser diodes. The produced image is fully 3-dimensional and can be viewed from all 360 degrees to gain spatial perspective. The technology is now deep into commercial development and is expected to soon be offered with pricing similar to that of ordinary consumer HDTVs.

Touchable holograms. Touchable hologram technology is the closest modern representation of the holographic displays that one might see in sci-fi movies. This display is unique in that it can detect a user's touch by sensing movements in the air. The device then provides haptic feedback to the user by sending an ultrasonic air blast in return. In Intel's demonstration of this technology, the display was showcased representing a touchless, responsive piano. A possible implementation for this technology would be interactive displays in public kiosks; because this type of display does not require a user to physically touch a screen, it ensures that bacteria and viruses do not get transmitted from person to person.

In particular, the RED Hydrogen One smart phones base their holographic projection capabilities on a technology called "Diffractive Lightfield Backlighting", which functions by placing a "nanostructured light guide plate" beneath an LCD phone screen. This provides four simultaneous images to be viewed together, and the resulting projected image is thus sometimes referred to as a "4V" or "4 View" image.

The more recent IKIN RYZ hologram accessory boasts an ability to convert 2D images into a 3D hologram, projected into the air directly adjacent to the device. The system uses a set of APIs and a SDK, along with a proprietary software technology called "neuroadaptive AI", which comprises a series of neural networks. The device will also use a scalar lens technology allowing holographic images to be displayed well in normal ambient light onto a dual-pane display screen attached to a mobile phone.

Pokémon Go uses a free downloadable app, and has successfully sent millions of people worldwide on digital scavenger hunts to hunt down and collect cartoon characters. It uses the camera and GPS system on an Android or iPhone handset to digitally superimpose animated creatures on top of whatever scenery appears on the smartphone's screen when its camera scans the surroundings. This use of augmented reality is often termed "location-based superimposition." Essentially, this augmented reality provides smartphone-based technology overlaying digital images atop the real world based upon location.

Google Glass is a similar technology that allows users to see text and images floating before their eyes. This enables users to superimpose images over reality (e.g., visualize a sofa in the living room before buying it, or visualize arrows on the ground in a virtual scavenger hunt). This type of application is generally termed "mixed reality." At present, new technologies are raising expectations for augmented and mixed reality beyond holding your phone out to see a physical object on the street corner.

The field of holography is highly active and newer and better versions of personal holographic displays are being developed and marketed quickly.

What is needed is a system and method for generating a unique, personal QR Code for an individual, preferably using holographic display projections, thus allowing access to customers or other parties in the proximity of the QR Code user, either by scanning a visually available Code or by providing such code directly from the user's device to the customer's device and thereby directing the customer to the user's webpage.

BRIEF SUMMARY OF THE INVENTION

In a preferred embodiment, a system comprising a projection device with a projector held or worn by a user, a customer mobile device with a camera and mobile application connecting the customer mobile device to a server algorithm located on a memory residing on one or more internet servers, wherein the projector projects a visible image containing a unique QR Code that is read by the camera, providing the customer with a link to a user profile on the customer mobile device.

In another preferred embodiment, the system described above, wherein the projection device is a smart phone or similar mobile device.

In another preferred embodiment, the system described above, wherein the visible image is projected onto the user's clothing or skin or displayed virtually.

In another preferred embodiment, the system described above, wherein the projection device is a mobile device and the visible image is a holographic display.

In another preferred embodiment, the system described above, wherein the holographic display is projected onto a two-pane or three-dimensional screen screen.

In another preferred embodiment, the system described above, wherein the holographic display is projected onto a two-dimensional screen using 3D projection.

In another preferred embodiment, the system described above, wherein the holographic display is projected into the air.

In another preferred embodiment, the system described above, wherein the user profile contains links to web pages containing one or more of product, service, vendor or purchase information.

In an alternate preferred embodiment, an alternate system comprising a projection device held or worn by a user and a customer mobile device, a server algorithm located on a memory residing on one or more internet servers, wherein each of the projection device and customer mobile device comprise a memory containing a mobile application for connection to the server algorithm and GPS capability, whereby the mobile application on the customer device receives an alert and notifies the customer of the proximity of the projection device and the user and provides a photo of the user and a link to a user profile page.

In another preferred embodiment, the alternate system described above, wherein the projection device is a smart phone or similar mobile device.

another preferred embodiment, the alternate system described above, wherein the algorithm uses location-based superimposition to provide the customer with a digital image signifying the user together with the alert.

In another preferred embodiment, a method of using the system disclosed herein above, comprising the steps of: 1. downloading a mobile application onto the projection device; 2. obtaining a unique QR Code for the user; 3. creating a user profile on the mobile application; 4. associating the unique QR Code with the user profile; 5. projecting the unique QR Code as a visible image in proximity to the user; 6. reading the unique QR Code with the camera of the customer mobile device; and 7. linking the customer to the user profile on the customer mobile device.

In another preferred embodiment, the method previously disclosed, wherein the visual image of step 5 is a holographic or similar multidimensional image.

In another preferred embodiment, the method previously disclosed, further comprising the step: 8. further linking the customer to a third party vendor web site via the user profile.

BRIEF DESCRIPTION OF THE DRAWINGS

FIG. 4 is a flowchart evidencing steps in a method of use of the QR Code system described herein.

DETAILED DESCRIPTION OF THE INVENTION

Figure 1:
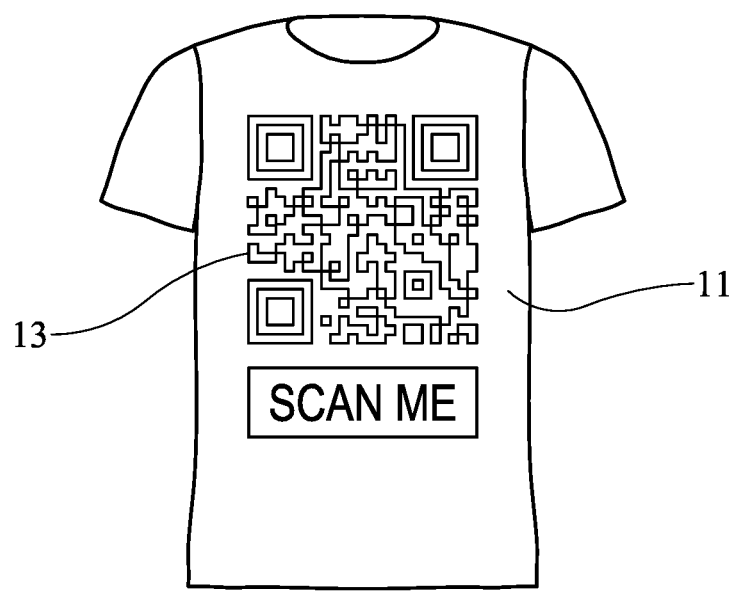
FIG. 1 is a line drawing of a holographic display QR Code user broadcasting his personal QR Code.

The invention constitutes a QR Code-based communication system with methods of manufacture and use wherein a user creates and manages a personal QR Code associated with his or her person, which code is either visually or holographically readable to customers in his or her proximity. The user will also create a profile on a software platform to which the QR Code can be linked, with such platform profile allowing a linkage between the code, when scanned, and preloaded personal information about the user, as well as links to advertisers and/or product and services endorsed by or affiliated with the user. A point of innovation in each iteration of the disclosed system and method is the use of a unique, personalized QR Code for influencer/displayer users and a related customer-reader interface that can be accessed via a mobile application.

To begin operating under the disclosed system, a user will open a profile on the web-based software platform, either through an application downloaded to a mobile device, a computer or other similar device. The user will be prompted to input personal information to identify the user as well as list products, services and companies or other individuals liked or used by the user. The user may use the platform to link with the profiles of other individuals and companies, which links will then be available to any customer reading the user's QR Code.

In a preferred embodiment, upon creating a profile, the user will be prompted to create a personal QR Code, either through a service within the platform itself or by linking to an outside code creation resource such as www.QRStuff.com, where the user will be guided through a step-by-step process for QR code creation.

Once created, the user's unique QR Code will become available for broadcast by the user to customers in the user's proximity. Options for such broadcast will include projection of the code onto the user or an item held or worn by the user, such as a patch or piece of clothing with a sufficient surface, or through a holographic image projected onto a three-dimensional (e.g., two paned) screen, a superimposed QR Code that remains in proximity with the users smart phone and which can be read with the QR-me reader, a QR Code broadcast that can be matched with the correct displayer by a chime or color change signaling the correct person and then accessed, or a holographic image projected into the air or onto a screen, created by and visible in proximity to a mobile device carried or worn by the user.

In a preferred embodiment, a system comprising an IKIN RYZ-styled holographic image or Google Glass image display will project the holographic QR Code image within near proximity of the influencer/displayers smart phone. Any individual with the QR-me reader application on their smart phone will be able to read the holographic QR Code and follow the links (e.g., to a website, Instagram, FaceBook, or other social media and/or private link) to whatever information the influencer/displayer wants to share. Otherwise, a projected holographic image of the QR Code (using current light projection display technology), or printed rendition of the personal QR Code will be used to accomplish the same end.

With the light projection display technology, the user will intentionally project his or her QR code onto their shirt or some fixed object, and any individual with a QR reader on their phone will be able to access the information and immediately load the information directed by that QR Code. With the printed rendition of the QR Code the displayer will order press-on, or iron-on decals from QR-me that will be placed on an item of clothing that will permit anyone with a QR reader to access the QR file.

In one iteration, the projection device will be located in an area close to but removed from the user's torso, such as on the user's arm or on a handheld bag, such that the projection device is able to project the QR Code onto the user's arm, chest and/or back. In such an embodiment, the user's skin, shirt or jacket itself may function as a type of screen, or may incorporate a patch or other screen-like surface. In one particular version, the projector device will be a smart watch or bracelet comprising a projection feature which projects an image directly onto the adjacent portion of the user's arm.

In another iteration, the projection device will be configured to produce a holographic display on a three-dimensional screen, such as a two-paned screen integrated into or attached to a mobile device. Alternatively, the three-dimensional screen may be located on the user's body or otherwise be in near enough proximity to the projection device to form a holographic or similar multidimensional image. In such an embodiment, the projection device will incorporate a projector feature that projects 2, 4 or more images simultaneously, which are captured on a multilevel screen and thus provide a three-dimensional visual image.

In a preferred embodiment, each individual will have the ability to customize the appearance of his or her own QR code projection. Possible customizations include variations in color, size, or the introduction of text and/or animation to the projected code.

For example, AT&T and Verizon each offer a holographic smartphone that will project stored images into the air above the screen of the smartphone, using technology as described herein. The Red Hydrogen One® smartphone is the first phone from video equipment company Red. The Android® phone features a holographic display that projects 3D images that can be viewed without special glasses.

In another preferred embodiment, the QR code will be three-dimensional, embodied as a cube or another 3D geometric shape or image. This will make the image scannable from multiple angles to passersby, or potentially be viewable from the side but only scannable from a single angle, such as the front. Such a 3D projection can be made using standard 3D projection technology, or holographically as described herein.

Once projected, the user's unique QR code image will become readable to customers via their own mobile devices using existing QR reader technology, just as QR codes currently employed by shops and restaurants are now readable to provide customers with immediate access to product, store or menu information. Within the described system, however, the customer will instead be forwarded via a web link to the system software plaform connecting him or her to the user's profile and thereby to all other profiles or advertisements connected to such profile. Such profile will constitute one or more web pages containing information and images related to the user and the user's preferred products, services, designs, vendors, etc., with hyperlinks for jumping to associated third party websites and pages. As holographic display technology advances, the size and quality of holographic images broadcast by mobile devices will also increase, allowing for holographic QR Codes to be identified by customers and read by customer devices at ever greater distances.

Since customers have already become accustomed to the action of using their mobile devices to read QR Codes and obtain links in public spaces, they will recognize the presence of a QR Code on or near the user's person. Thus, should the customer be interested in the appearance of the user, whether due to dress, hair, cosmetics, fitness or otherwise, the customer may be inclined to scan the user's unique QR code to obtain information on what apparel the user wears, what diet or fitness regimen the user employs, what gym or hair salon the user visits, or any other of a myriad of potential products and services that might be attractive to the customer. By accessing the user's profile and the links contained therein, the customer will not only be able to ascertain the brands of the various products and services related to the user, but will also have the option of being forwarded directly to vendor profiles and/or websites enabling the customer to immediately make appointments or purchases.

In one embodiment, the user's unique QR Code will be generated by a smart phone or other mobile device held in the user's hand, such device sometimes referred to herein as the "projection device". In other embodiments, the projection device may be worn on the user's person. Examples of wearable devices may be a smart watch, a smart phone inserted into an armband, or similar devices worn on neck cords, shoulder pads, as well as pockets or straps incorporated into the user's clothing, a bag carried by the user, or a similar arrangement.

While a projected QR Code image that is visible to the naked eye may be used, it is also possible for the projected QR Code to be virtual in nature. In one preferred embodiment, the unique QR Code may be stored in the application software and available for air drop or similar wireless communication to any customer who scans the crowd in search of a QR Code. When the QR reader of the customer mobile device aligns with the user, the smartphone will signal alignment through a written alert, sound or color change that user's information profile can be accessed. Such an embodiment may also provide a notification to a customer whenever a user is in proximity, regardless of active scanning by the customer.

Such embodiment may use location-based superimposition, similar to that employed by Pokemon Go and in lieu of QR cCodes, whereby alignment of the customer mobile device with the individual user, and detection of the user's mobile device, accesses the user's mobile device GPS location and prompts an image or other notification to appear on the customer mobile device screen, such image including or appearing with a link to the user's profile page. Preferably, such image will be unique to the user. The connection between the customer's and user's mobile devices will be initiated via the application software, and may employ communication features such as air drop, Bluetooth or similar features already commonly available in current mobile devices.

Regarding the web-based software platform itself, in one embodiment, the platform will be executed using one or more internet servers, each comprising a processor and a memory containing an algorithm for establishing user profiles, such algorithm providing for connection with and access by a mobile application downloadable to individual mobile devices and personal computers.

In a preferred embodiment, a user will receive a notice or alert whenever his or her unique QR code is used to access the associated user profile. The mobile application software may also provide customers with the option to provide users with a customer photo to enable users to approach and converse with customers in person.

DETAILED DESCRIPTION OF THE FIGURES

FIG. 1 shows a two-dimensional unique QR code 13 printed on a screen 11, such screen embodied as a shirt.

Figure 2:
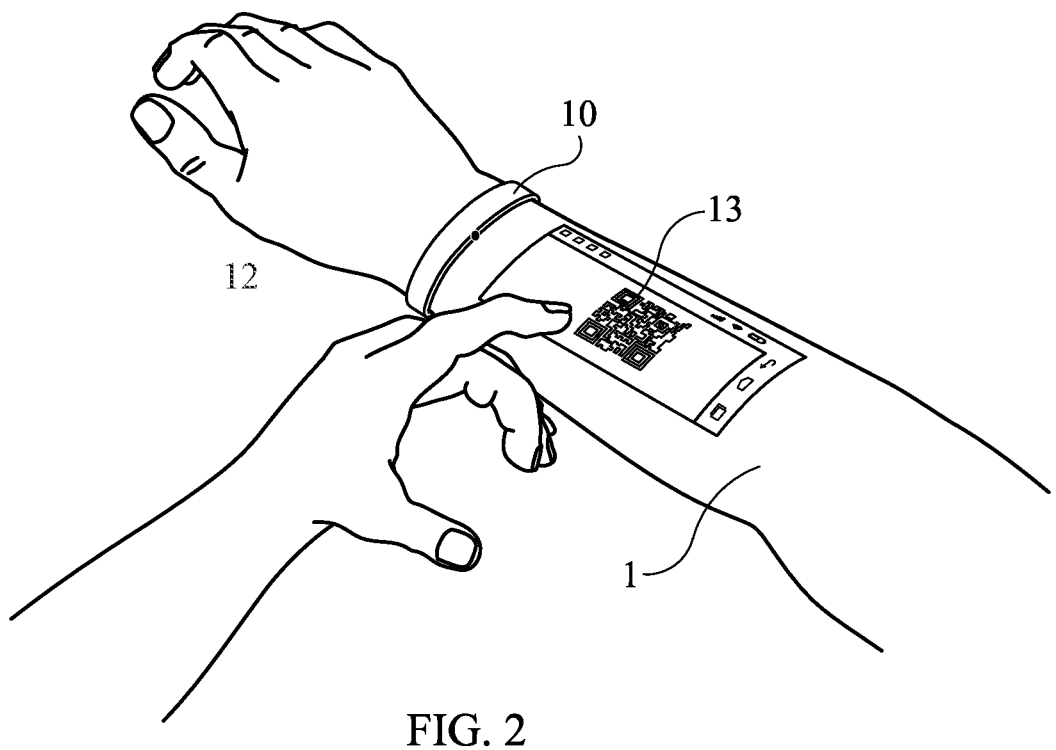
FIG. 2 is a line drawing of a passerby customer reading a user QR Code using the customer's mobile device.

FIG. 2 shows a two-dimensional unique QR code 13 projected by projection device 10, embodied as a smart watch/bracelet worn on the wrist of user 1, onto a screen consisting of the user's arm.

Figure 3:
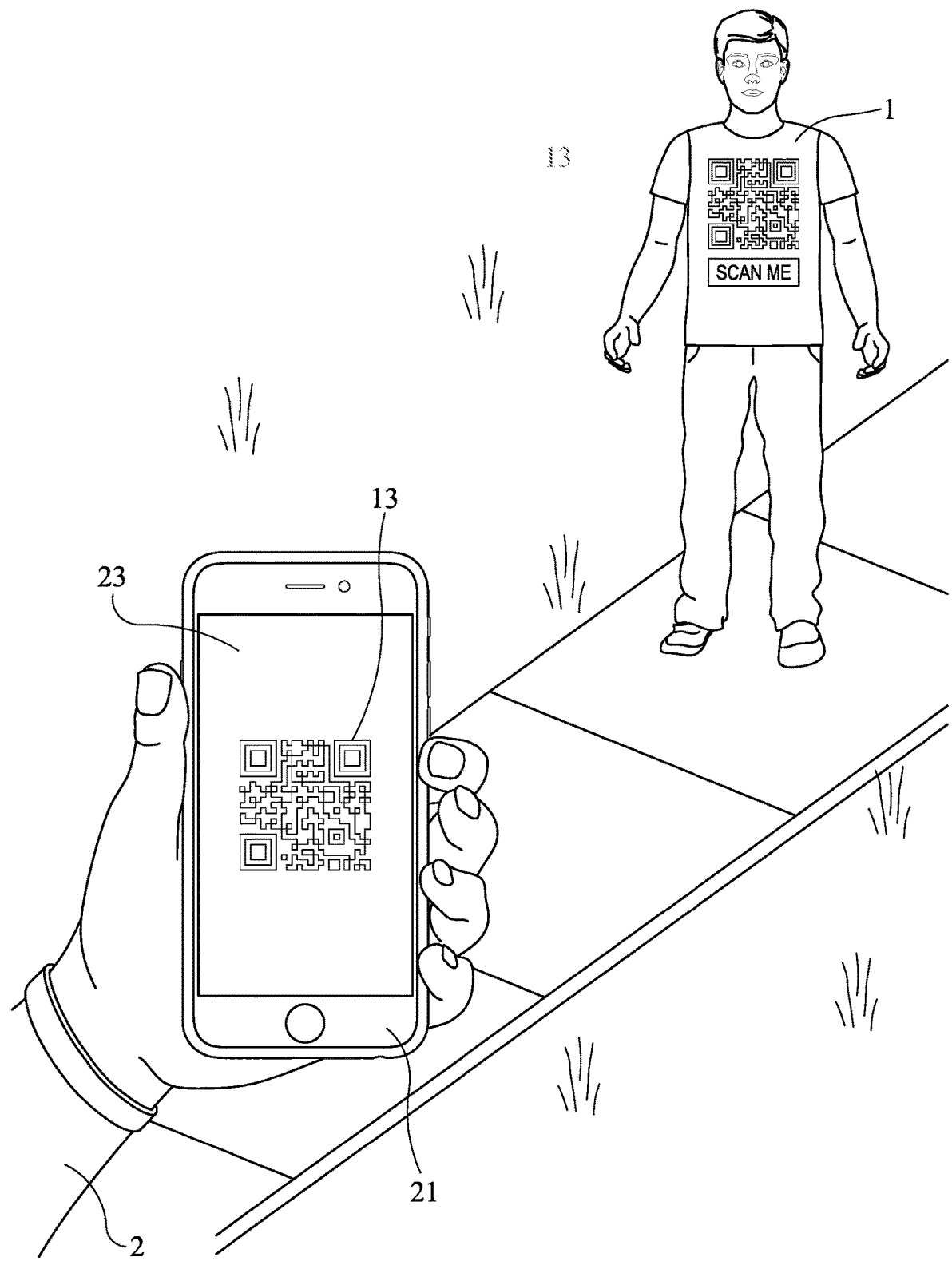
FIG. 3 is a line drawing of a customer mobile device scanning a user and projecting QR code link to the user's profile.

FIG. 3 is a line drawing of a customer 2 holding a customer mobile device 21 scanning a unique QR Code 13 of user 1 and projecting QR code 13 onto the device screen 23, thereby initiating a link to the user's online profile.

FIG. 4 is a flow chart providing the sequential steps required for a method of using a unique QR code by an individual user to provide a customer access via the customer's mobile device to link to a user profile via the internet. In a preferred embodiment, the user profile will contain additional marketing information and/or links to other web pages containing marketing information for shopping and the purchase of products.

LIST OF REFERENCE NUMBERS 1 user
2 customer
10 projection device
11 screen
12 projection device projector
13 unique QR Code
14 3D unique QR Code
21 customer mobile device
22 camera
23 mobile device screen
30 user online profile The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

I claim:

1. A system comprising a projection device with a projector held or worn by a user, a customer mobile device with a camera and mobile application connecting the customer mobile device to a server algorithm located on a memory residing on one or more internet servers, wherein the projector projects a visible image containing a unique QR Code that is read by the camera, providing the customer with a link to a user profile on the customer mobile device, and wherein the algorithm uses location-based superimposition to provide the user with a digital image signifying the user together with an alert.

2. The system of claim 1, wherein the projection device is a smart phone or similar mobile device.

3. The system of claim 1, wherein the visible image is projected onto the user's clothing or skin or displayed virtually.

4. The system of claim 1, wherein the projection device is a mobile device and the visible image is a holographic display.

5. The system of claim 4, wherein the holographic display is projected onto a two-pane or three-dimensional screen screen.

6. The system of claim 4, wherein the holographic display is projected onto a two-dimensional screen using 3D projection.

7. The system of claim 4, wherein the holographic display is projected into the air.

8. The system of claim 1, wherein the user profile contains links to web pages containing one or more of product, service, vendor or purchase information.

9. A system comprising a projection device held or worn by a user and a customer mobile device, a server algorithm located on a memory residing on one or more internet servers, wherein each of the projection device and customer mobile device comprise a memory containing a mobile application for connection to the server algorithm and GPS, whereby the mobile application on the customer device receives an alert and notifies the customer of the proximity of the projection device and the user and provides a photo of the user and a link to a user profile page, wherein the algorithm uses location-based superimposition to provide the customer with a digital image signifying the user together with the alert.

10. The system of claim 9, wherein the projection device is a smart phone or similar mobile device and the projection device projects a visible image containing a QR Code.

11. A method of using the system of claim 9, comprising the steps of:
 (1) downloading a mobile application onto the projection device;
 (2) obtaining a unique QR Code for the user;
 (3) creating a user profile on the mobile application;
 (4) associating the unique QR Code with the user profile;
 (5) projecting the unique QR Code as a visible image in proximity to the user;
 (7) reading the unique QR Code with the camera of the customer mobile device; a
 (8) linking the customer to the user profile on the customer mobile device.

12. The method of claim 11, wherein the visual image of step 5 is a holographic or similar multidimensional image.

13. The method of claim 11, further comprising the step 9 the customer to a third party vendor website via the user profile.

* * * * *